July 28, 1959   J. CARTY   2,896,969
RETRACTABLE HITCH STRUCTURE FOR HOUSE TRAILERS OR THE LIKE
Filed Jan. 10, 1958
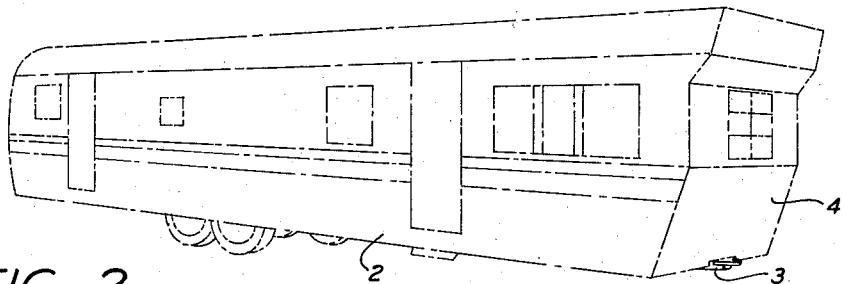
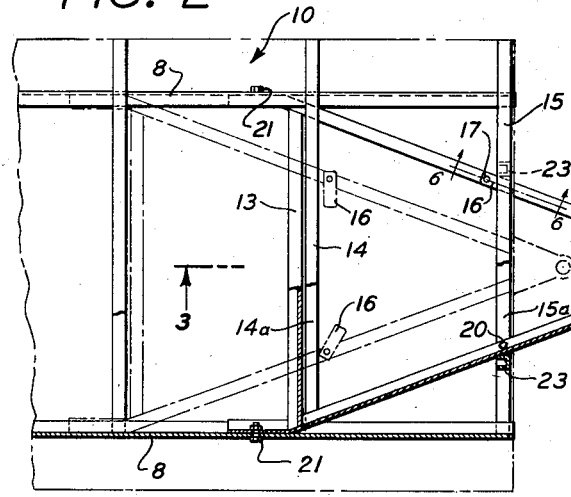
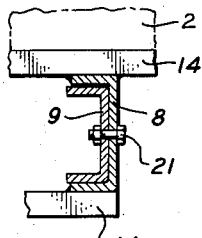
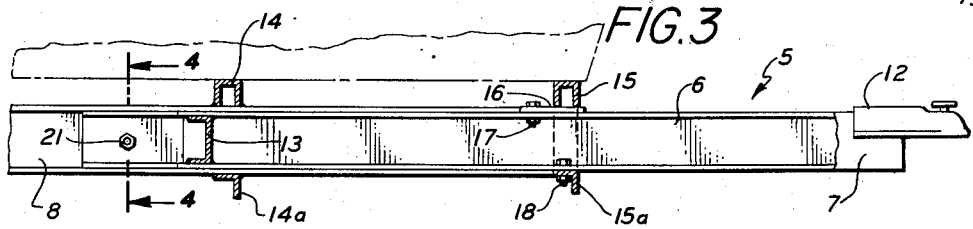
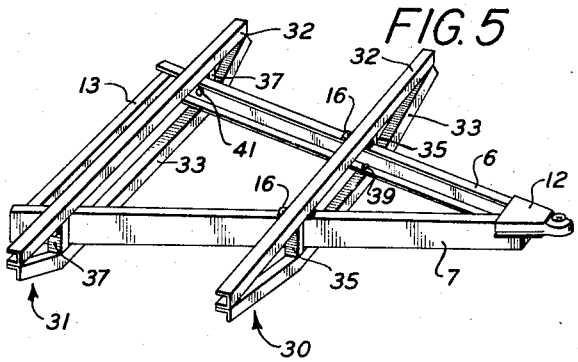
INVENTOR.
John Carty
BY Scott L. Norvell
ATTORNEY

United States Patent Office 2,896,969
Patented July 28, 1959

2,896,969

RETRACTABLE HITCH STRUCTURE FOR HOUSE TRAILERS OR THE LIKE

John Carty, Phoenix, Ariz.

Application January 10, 1958, Serial No. 708,151

3 Claims. (Cl. 280—491)

This invention concerns retractable hitches for house trailers.

Heretofore hitches for house trailers, ordinarily drawn by an automobile or light truck, have been solid and stationary and immovably attached to the front end of the frame of the trailer. As the trailers have increased in size, but the parking spaces in trailer courts or storage areas have not increased in size, it is necessary that some means be made to remove or retract the trailer tongue or draw bar structure so that the space in front of the trailer will not be obstructed. In some instances the trailer tongues have been entirely removed by removal of the bolts or their equivalent which hold the tongue to the frame body. In other instances the tongues have been cut off with an acetylene torch and when the trailer was to be again moved the tongue has been rewelded to the frame. Since the trailer parking spaces have been laid out for trailers of more modest dimensions than those now in common use it is convenient, if not absolutely necessary, to provide some way of disposing of the trailer tongue or draw bar, as the case may be.

One of the objects of this invention is to provide a structure used in connection with a trailer frame that will permit the draw bar to be released and slid under the trailer body when not in use.

Another object is to provide a unit tongue structure which will cooperate with a slide structure within the trailer frame to make it possible to slide the tongue and/or draw bar into a previously constructed slideway beneath the trailer body and within or below the trailer frame so that when the draw bar is withdrawn into the frame there are no outside projecting parts and the trailer body can be moved closely adjacent to the roadway which joins the parking spaces.

Still another object is to provide a slide-way beneath a trailer body which will slidably support a unit draw bar tongue and afford a simple means of fastening the tongue to the trailer frame when it is slid to its forward running position.

I attain the foregoing objects by means of the devices, parts, and combinations of parts shown in the accompanying drawings in which—

Figure 1 is a perspective view of a trailer house provided with my improved type of tongue.

Figure 2 is a plan view of the frame beneath the trailer house and the retractable tongue and supporting mechanism.

Figure 3 is a sectional elevational view of the retractable tongue and its supporting means, taken in section on line 3—3 of Figure 2.

Figure 4 is a section of the tongue frame and its supporting means in the trailer frame taken substantially on line 4—4 of Figure 3.

Figure 5 is a perspective view of a modified form of a tongue and its supporting means.

Figure 6 is a sectional elevation of the trailer parts taken on line 6—6 of Figure 2 and Figure 7; and Figure 7 is a plan view of the trailer frame with reference to the tongue showing fragments of each of these parts and drawn on a somewhat enlarged scale.

Similar numerals refer to similar parts in the several views.

In Figure 1 the tongue and draw bar is indicated by numeral 3 which is at the front end 4 of the house trailer body 2, the tongue is in the retracted position and only the front portion is shown.

The tongue plan view shows that it has the general shape of an A frame 5. This includes side members 6 and 7 the rear portions of which are slidably supported within the C-shaped longitudinal frame members 8 of the trailer bed frame 10. This slidable support is best shown in Figure 4.

From slide shoes 9 at each end portion of each of the side members 6 and 7 the lateral members of the tongue converge forwardly and are joined by a trailer hitch member 12 at their front ends. The rear portions of the side members are braced by transverse spreader 13.

Forward of the slide shoes 9 the body of the tongue is supported on transverse frame members 14 and 15 of the trailer frame 10. When the trailer tongue is in the forward or extended position, shown in solid lines, Figure 2, the slide members are moved forward just to the rear of the transverse body frame member 14 and the intermediate and forward weight of the tongue is supported by the lower transverse body frame members 14a and 15a. In this forward position the lateral tongue members 6 and 7 are wedged into position by the pivoted wedge locks 16. These are pivotally attached at 17 to each of the members 6 and 7 and when swung forwardly wedge between the top of each of the members 6 and 7 and the underface of the top transverse trailer body frame member 15. In this forward position the tongue is also held by bolts 20 which extend through the lateral members 6 and 7 and the lower transverse member 15a. Also bolts 21 extend through the lateral draw bar members 6 and 7 and the sides of the trailer body frame members 8 as shown in detail in Figure 4.

In the retracted position the tongue frame 5, being supported at the rear by the shoe portions 9 in the channel of frame members 8 of the frame 10, need not be fastened. The forward portion of the draw bar then rests on transverse body frame members 14a and 15a. Wedges 16 are not used, and bolts 21 and 23 are removed.

To move the draw bar forward from the retracted position it is only necessary to grasp the hitch portion 12 and pull it forward until its motion is stopped by the vertical stops 23 which are attached to and join the forward frame members 15 and 15a. The bolts 18 are then put in place and the wedges 16 driven into locked position by using a hammer. This means of attachment is sufficient to hold the forward portion of the draw bar. Thereafter the shoe portions of the lateral members of the tongue are secured by the bolts 21. The tongue and draw bar are then ready for use for pulling the trailer.

The above device pre-supposes that the trailer has a bed frame which includes the two lateral members 8 which are made of steel having a channel and a C shaped cross section. Where the trailer house does not have a frame with lateral members such as 8, but has flat bottom face for the floor, the modification shown in Figure 5 is used.

Here two transverse supporting members 30 and 31 are attached to the bottom face of the trailer floor. Each of these members has an upper transverse bar 32 and a bottom transverse bar 33. The end portions of the bottom bars are bent upward and welded to the ends of the upper bars. The draw bar body 5 moves between the upper and lower transverse bars of members 30 and 31. Vertical stops 35 are positioned on the forward transverse member 30 joining its upper and lower bars so that the forward motion of the draw bar is limited by contact of its side members 6 and 7 with the stops 35, as shown in Figure 5. Likewise vertical stop members 37 are provided for the rear transverse frame member 31.

Further details of the structure are the same as shown in the types first mentioned. Thus, the lateral members of the draw bars 6 and 7 are bolted and wedged between the bars of the members 30 and 31 by wedges 16 and bolted, as at 39 and 41 in substantially the same manner as they were bolted to the transverse members shown in Figure 2 except that the bolts go through the lower bars of the cross members 30 and 31.

From the foregoing it will be apparent that in the trailer body I have provided the two transverse frame members, such as 14 and 15 composed of upper and lower bars to provide a slideway or rectangular retention frame into which the A shaped tongue will slide. When in the retracted or rear position the tongue is out of the way and permits the trailer to be parked very near to any adjacent roadways. When the trailer tongue is extended into operative position it is still retained by the upper and lower bars of the trailer frame but is locked in position by the bolts shown and by lateral contact with the vertical members within the transverse frame members. These act as stops. In the first form above explained, the shoes at the rear ends of the tongue frame side members are added for additional stability.

In both forms of the device the A shaped tongue works freely in the rectangular slideway provided by the transverse bars and the longitudinal frame members. When the trailer is stored it is not necessary to fasten the tongue frame to any part of the house trailer frame.

In case of an emergency, such as a fire or the like, the tongue frame can immediately be pulled forward to the operating position. In this case the sides 6 and 7 of the tongue frame engage against the vertical trailer house frame members 23, 35 and 37. These parts form stops for the wedge shaped tongue frame. The trailer house may then be immediately moved. However, for use on the road the tongue frame is always fastened by the bolts shown and held against vibration by the pivoted wedges 16.

I claim:

1. A trailer having a bed frame including inwardly opening laterally positioned channel section longitudinal frame members, a transverse frame member joining the front ends of said longitudinal frame members composed of an upper bar and a lower bar spaced below said upper bar, a second transverse frame member having an upper and a lower bar disposed rearwardly from said front transverse frame member, vertical stops symmetrically disposed relative to the center of said transverse bed frame members, between the upper and lower bars of said transverse frame members disposed so as to contact the outer faces of the side members of an A shaped tongue frame having forwardly converging side members, a hitch attached to the fore ends of said side members, a spreader bar at the rear of said side members and shoes adapted to slide in the channels of said longitudinal trailer frame members at the rear of said tongue side members; said tongue frame being slidably supported on the lower bars of said frame transverse members and said shoes being slidably supported in the channels of said longitudinal frame members; wedge means pivotally mounted on said tongue at the point adjacent said stop when said tongue is in extended position for securing said tongue to said bed frame when in forwardly extended position; forward motion of said tongue A frame being limited by contact of its converging side members with said vertical stops in said transverse trailer frame members.

2. In a house trailer having a bed frame, retractable hitch structure including laterally disposed channel shaped longitudinal frame members having their channels opening inwardly to provide a slideway for the side portions of an A shaped tongue, transverse frame members having upper and lower members attached to said longitudinal frame members in horizontal alignment with the upper and lower edges, respectively, of said longitudinal frame members forming a slideway to support the central portion of said tongue, vertical stops to contact the sides of said tongue disposed between said upper and lower transverse frame members; said tongue having an A shaped frame with forwardly converging and rearwardly diverging side members slideable fore and aft between the upper and lower members of said transverse bed frame members, forward motion of said tongue being limited by contact of its side members with said vertical stops; a hitch at the forward end of said tongue frame, and wedge means pivotally mounted on said tongue at the point adjacent said stop when said tongue is in extended position for securing said tongue to said bed frame when in forwardly extended position.

3. In a house trailer having a bed frame, retractable hitch structure including, in combination, transverse members attached to the bottom of said bed frame and longitudinally disposed on the front portion of said trailer frame; said transverse members each being composed of a transverse upper bar and a transverse lower bar and vertical stops extending between said bars adapted to contact the sides of an A shaped tongue frame; said transverse frame bars forming a horizontal slideway for said A shaped tongue frame, said slideway being open at the front to permit slidable forward extension of said tongue frame in said slideway between the upper and lower bars of said transverse bed frame members, forward motion of said tongue being limited by contact of its side members with said vertical stops; a hitch at the forward end of said tongue frame, and wedge means pivotally mounted on said tongue at the point adjacent said stop when said tongue is in extended position for securing said tongue to said bed frame when in forwardly extended position.

References Cited in the file of this patent

FOREIGN PATENTS

| 375,840 | Germany | May 18, 1923 |
| 588,912 | Great Britain | June 5, 1947 |